May 8, 1945.    T. V. BUCKWALTER    2,375,727
CAR TRUCK
Original Filed Dec. 29, 1941    2 Sheets-Sheet 1

INVENTOR:
Tracy V. Buckwalter,
by Van Cleve & Grandy,
HIS ATTORNEYS.

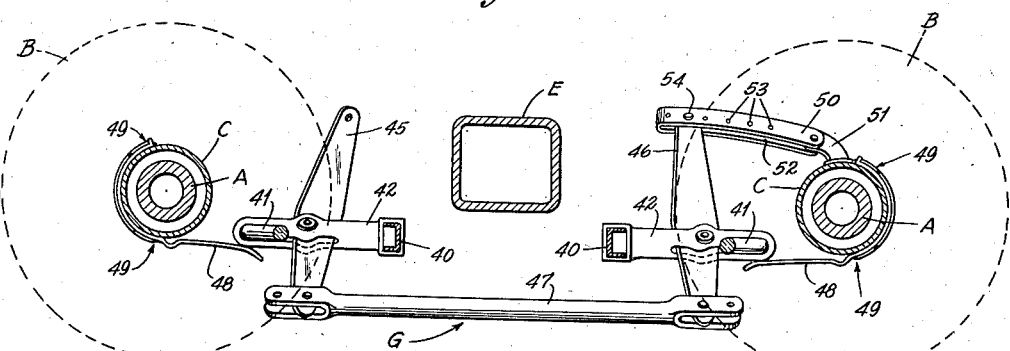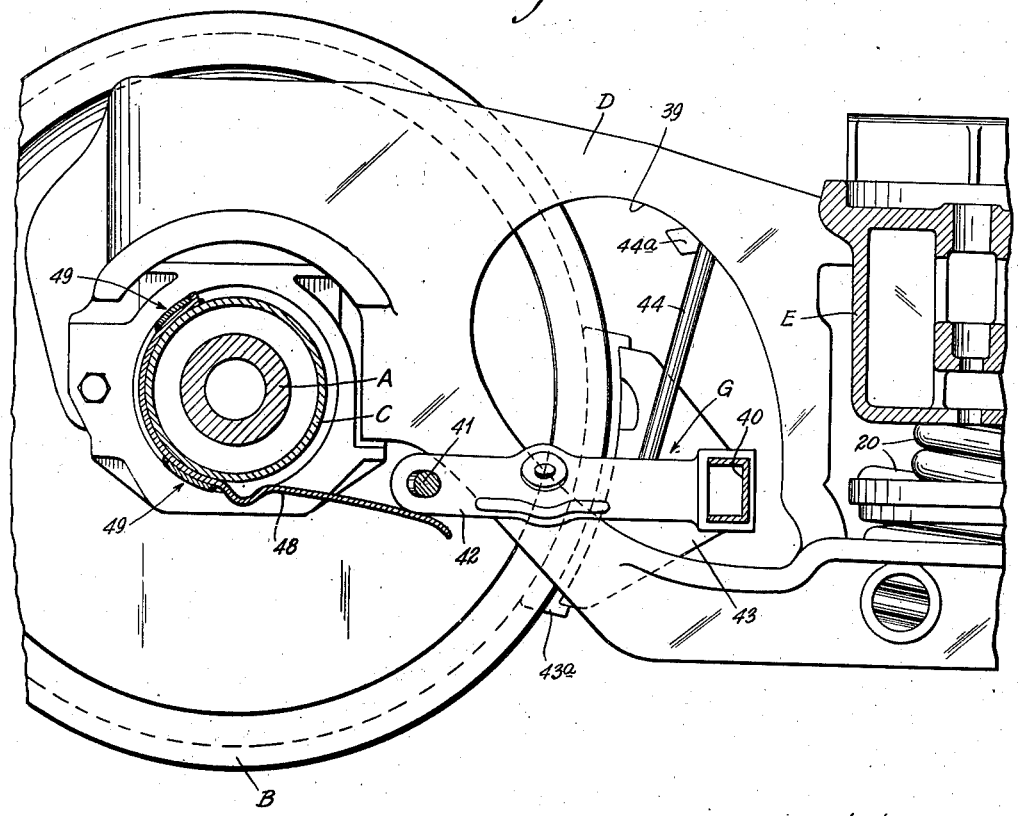

Patented May 8, 1945

2,375,727

UNITED STATES PATENT OFFICE 2,375,727

CAR TRUCK

Tracy V. Buckwalter, Massillon, Ohio, assignor to The Timken Roller Bearing Company, Canton, Ohio, a corporation of Ohio Original application December 29, 1941, Serial No. 424,693, now Patent No. 2,352,163, dated June 27, 1944. Divided and this application April 20, 1944, Serial No. 531,850

7 Claims. (Cl. 188—207)

This application is a division of my application Serial No. 424,693, filed December 29, 1941, now Patent No. 2,352,163, June 27, 1944, for patent for Car truck.

This invention relates to railway car trucks of the type wherein the wheels are fixed on axles that are mounted inside of tubular housings. The object of the present invention is to devise a simple and economical, strong and durable, easily operable light-weight brake mechanism for trucks of the above type that will prevent the toes of the brake shoes from riding on the wheel, and that will provide for regular and even application of the brake shoes regardless of vertical movement of the spring supported truck bolster. The invention consists in the railway car truck and brake mounting and in the parts and combinations and arrangements of parts hereinafter described and claimed.

Figure 1:
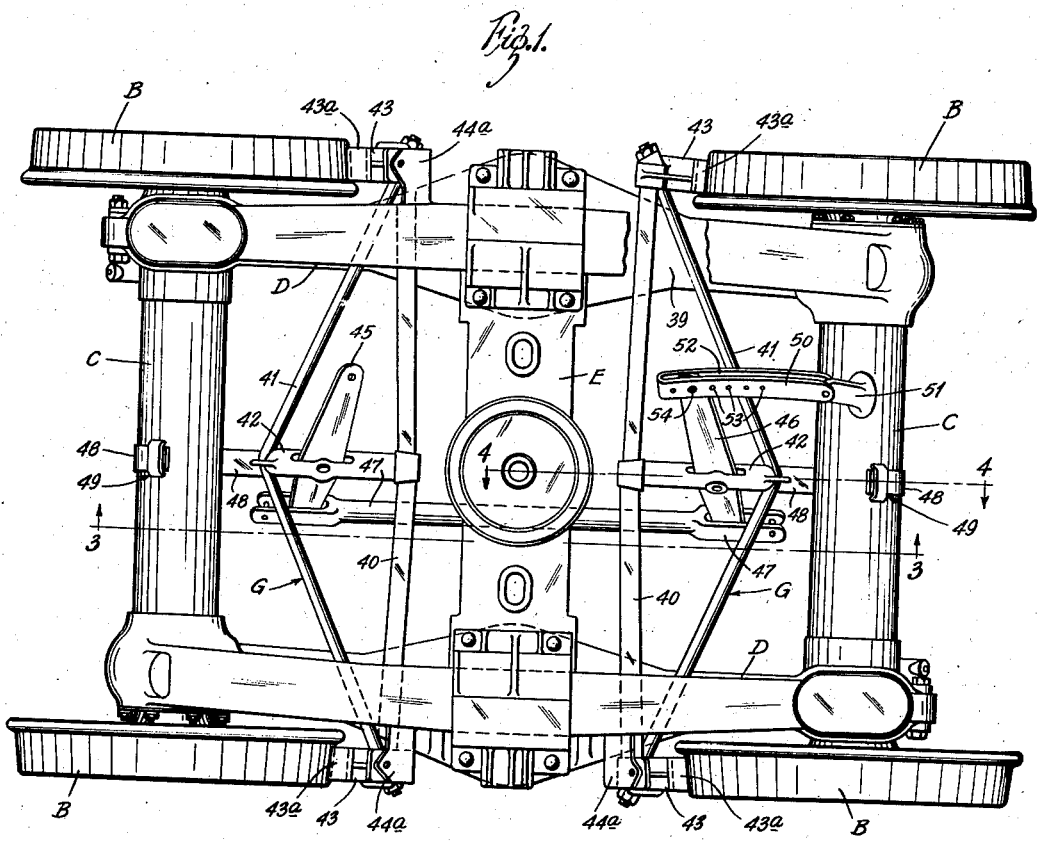
Figure 2:
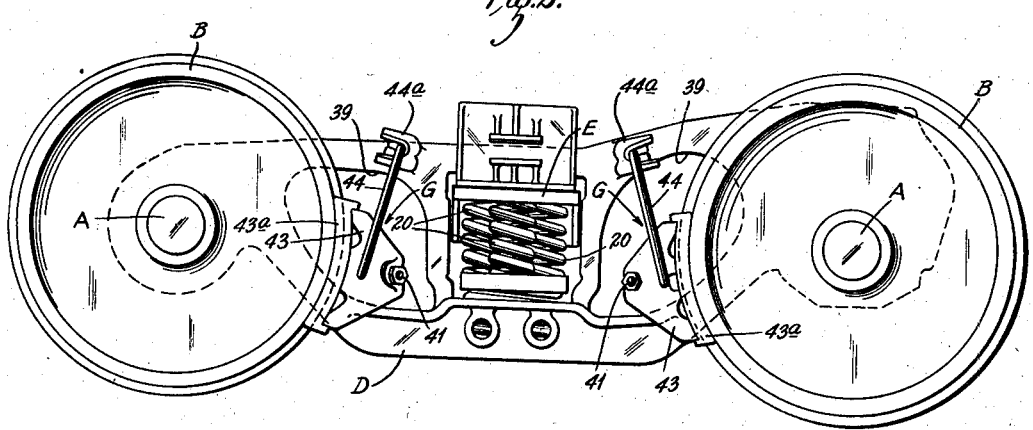

In the accompanying drawings, which form part of this specification and wherein like symbols refer to like parts wherever they occur, Fig. 1 is a top plan view of a railway car truck provided with a brake mechanism embodying my invention, Fig. 2 is a side elevational view of the truck, Fig. 3 is a vertical longitudinal section on the line 3—3 in Fig. 1; and Fig. 4 is an enlarged fragmentary vertical longitudinal section on the line 4—4 in Fig. 1.

In the accompanying drawings, my invention is shown embodied in a spring-plankless inboard railway car truck comprising a pair of axles A having wheels B fixed to the ends thereof, tubular axle housings C enclosing said axles between the wheels thereon, side frames D connecting said axle housings, and a cross beam or truck bolster E extending from side frame to side frame midway of the ends of said truck. The truck bolster E is supported at its ends in the bolster openings of the side frames D for vertical movement relative thereto preferably by means of nests or groups of coil springs 20.

As shown in the drawings, the truck is provided with a brake gear comprising brake beams G that are disposed crosswise of the truck one on each side of the truck bolster E and extend through openings 39 provided therefor in the respective side frames D. Each of these brake beams comprises a channel-shaped compression member 40, a tension rod 41 and a strut member 42 interposed between said compression and tension members midway of the ends of the brake beam. Each brake beam G has a brake head or block 43 fixed to each end thereof, which block has a brake shoe 43a fixed thereto for cooperation with an adjacent car wheel B and is suspended from an adjacent side frame D by means of a brake hanger 44 that is supported at its upper end in a suitable brake hanger bracket 44a formed integral with said side frame on the outer side face thereof. The strut member 42 of one of the brake beams has a live brake lever 45 fulcrumed thereon; and the strut member of the other brake beam has a dead brake lever 46 fulcrumed thereon. The lower ends of the brake levers 45 and 46 are connected by the usual brake lever connection or brake rod 47; and the upper end of the live brake lever 45 is adapted for connection with the usual pull rod (not shown) through which the brake power is applied.

Each brake beam G is provided with an auxiliary support comprising a spring bracket 48 that is clipped and welded, as at 49, to the axle housing crosswise thereof. The free end of this spring bracket 48 extends beneath the tension rod receiving end of the strut 42 of the brake beam and thus serves to yieldably support the same.

The brake gear also includes a dead lever stop or guide comprising a longitudinally curved arm 50 that is pivotally supported at one end on an upstanding bracket 51 fixed to the top of an adjacent axle housing C. This guide has a longitudinal slot 52 therein for the upper end of the dead brake lever 46, a series of longitudinally spaced transverse holes 53, and a suitable locking pin 54 that is inserted through said hole and a registering hole in said brake lever.

The brake beam supporting brackets 48 yieldably support the tension members of the brake beams G in the region of the struts 42 and thus prevent the toes of the brake shoes 43a from riding or dragging on the wheels B and thus prolong the life of the brake shoes. The spring brackets 48 are fixed to the axle housings C, which are subject to very little vertical movement relative to the brake beams G. Thus, said brackets are relieved of stresses that would tend to cause them to break in service.

The brake lever bar stop or guide bar 50 is pivotally supported on the axle housing, which has very little vertical movement relative to the brake beam, thereby maintaining a substantially fixed relation of said bar with respect to said brake beam and thus providing improved brake application.

Obviously, the hereinbefore described truck construction admits of considerable modification without departing from the invention. Therefore, I do not wish to be limited to the precise construction shown and described.

What I claim is:

1. A car truck comprising wheeled axles, housings enclosing said axles, side frames connecting said housings, and brake beams sustained at their ends by said side frames and intermediate between their ends by said housings.

2. A car truck comprising wheeled axles, housings enclosing said axles, side frames connecting said housings, brake beams supported at their ends from adjacent side frames, brake levers fulcrumed in said brake beams, and a brake lever guide pivotally supported on one of said housings and cooperating with the brake lever of an adjacent brake beam.

3. A car truck comprising wheeled axles, housings enclosing said axles, side frames connecting said housings, brake beams supported at their ends from adjacent side frames and midway of their ends from said housings, brake levers fulcrumed in said brake beams, and a brake lever guide pivotally supported on one of said housings and cooperating with the brake lever of an adjacent brake beam.

4. A car truck comprising wheeled axles, housings enclosing said axles, side frames connecting said housings, a spring supported bolster extending from side frame to side frame, brake beams sustained by said side frames and housings without support from said bolster, brake levers fulcrumed in said brake beams, and a brake lever guide pivotally supported on one of said housings and cooperating with the upper end of a brake lever of an adjacent brake beam.

5. A car truck comprising wheeled axles, housings enclosing said axles, side frames connecting said housings, brake beams sustained by said side frames, and spring brackets rigidly secured to said housings with their free ends disposed beneath said brake beams to afford support therefor.

6. A car truck comprising wheeled axles, housings enclosing said axles, side frames connecting said housings, brake beams sustained at their ends by said side frames, and spring brackets fixed to said housings and extending around the undersides thereof and beneath said brake beams to afford support therefor intermediate the ends thereof.

7. A car truck comprising wheeled axles, housings enclosing said axles between the wheels thereon, side frames connecting said housings, brake beams supported at their ends from adjacent side frames, brake levers fulcrumed in said brake beams, a brake rod connecting the lower ends of said brake levers, a brake lever guide pivotally supported on one of said housings and cooperating with the upper end of an adjacent brake lever, and spring brackets rigidly secured to said housings and extending beneath said brake beams to afford support therefor intermediate between the side frame supported ends thereof.

TRACY V. BUCKWALTER.